United States Patent
Hoffman

Patent Number: 5,706,218
Date of Patent: Jan. 6, 1998

[54] RANDOM NUMBER GENERATOR

[75] Inventor: Eric J. Hoffman, Chandler, Ariz.

[73] Assignee: Intel Corporation, Santa Clara, Calif.

[21] Appl. No.: 648,553

[22] Filed: May 15, 1996

[51] Int. Cl.$^6$ .................................................. G06F 7/58
[52] U.S. Cl. ........................................ 364/717; 331/78
[58] Field of Search .......................... 331/78; 380/46; 364/717

[56] References Cited

U.S. PATENT DOCUMENTS

| | | | |
|---|---|---|---|
| 3,790,768 | 2/1974 | Chevalier et al. | 364/717 |
| 4,578,649 | 3/1986 | Shupe | 331/78 |
| 4,694,412 | 9/1987 | Domenik et al. | 364/717 |
| 4,791,594 | 12/1988 | Harney et al. | 364/717 |
| 4,810,975 | 3/1989 | Dias | 331/78 |
| 4,855,690 | 8/1989 | Dias | 331/78 |
| 5,007,087 | 4/1991 | Bernstein et al. | 380/46 |
| 5,627,775 | 5/1997 | Hong et al. | 364/717 |

OTHER PUBLICATIONS

An LSI Random Number Generator (RNG), Published in proc. Advances in Cryptology Conference on CRYPTO, 1984, Fairfield, et al., pp. 203–215.

*Primary Examiner*—David H. Malzahn
*Attorney, Agent, or Firm*—Blakely, Sokoloff, Taylor & Zafman

[57] ABSTRACT

A random number generator using a single, slow, voltage controlled oscillator which receives a noise input and a plurality of high frequency ring oscillators. The ring oscillators are sampled under control of the slow oscillator. A circuit is used between the output of each of the ring oscillators and its respective D-type latch to assure that the sampling is unbiased, that is, that there will be near even distribution of 1s and 0s in the random numbers.

17 Claims, 2 Drawing Sheets

RANDOM NUMBER GENERATOR

BACKGROUND OF THE INVENTION

1. Field of the Invention

The invention relates to the field of random number generators.

2. Prior Art

Circuits for generating random numbers, or more accurately, pseudo random numbers are well-known in the art. One such circuit using a slow oscillator and fast oscillator is disclosed in U.S. Pat. No. 4,694,412. Other pseudo random number generators are described in U.S. Pat. No. 5,007,087 and 4,855,690. Systems for scrambling bits are also known such as shown in U.S. Pat. No. 4,791,594.

In "An LSI Random Number Generator (RNG)", published in Proc. Advances in Cryptology Conference on CRYPTO, 1984 by Fairfield, Mortenson and Coulthart, a slow and a fast oscillator are used where the natural variation in frequency of the slow oscillator is relied upon for developing the random signal. As will be seen the present invention improves upon this circuit.

SUMMARY OF THE INVENTION

A circuit for generating a random number is disclosed which uses a noise source for varying the frequency of a first oscillator. The output of the first oscillator is used to control the sampling by a D-type flip-flop of the output of a second oscillator which has a nominal frequency substantially higher than that of the first oscillator. In one embodiment a plurality of second oscillators are used all of which are sampled under control of an output signal from a single first oscillator.

The present invention includes a circuit which assures that the sampling process does not favor either the 1 or the 0 state, Thus, the random numbers generated have a substantially equal number of 1s and 0s.

DETAILED DESCRIPTION OF THE PRESENT INVENTION

Figure 1:
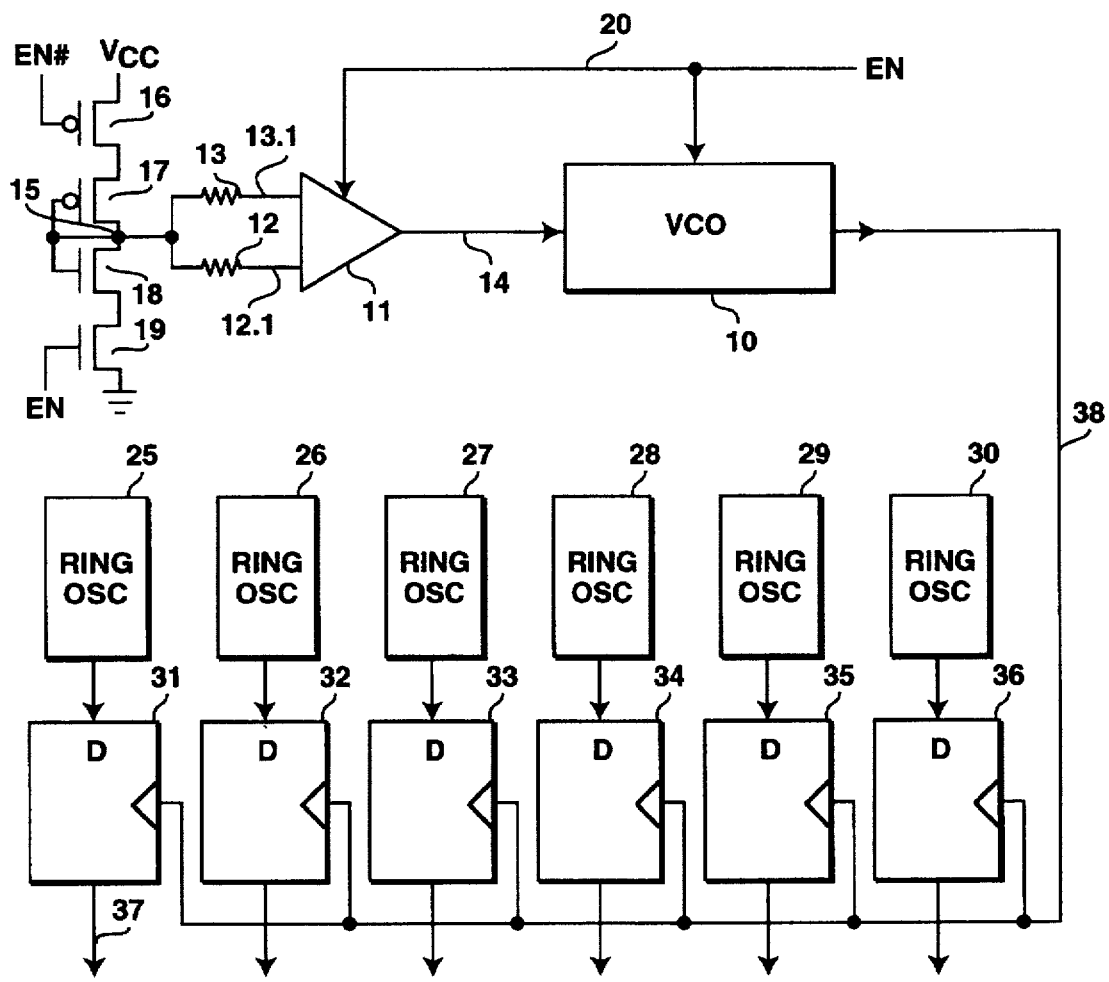
FIG. 1 is a block diagram of the present invention.

A random bit source is described which includes a circuit for assuring that the random numbers generated have a substantially equal number of 1s and 0s. In the following description numerous specific details are set forth such as specific oscillator frequencies, in order to provide a thorough understanding of the present invention. It will be obvious to one skilled in the art that the present invention may be practiced without these specific details. In other instances, well-known circuits are shown in block diagram form in order not to obscure the present invention.

Referring now to FIG. I the random number generator includes a first, relatively low frequency voltage controlled oscillator (VCO) 10 which is used to control sampling of a plurality of second, high frequency oscillators 25-30. In one embodiment a voltage control oscillator 10 operates at a nominal frequency of 450 kHz. The frequency of operation of the VCO 10 is controlled by a signal on line 14. This signal is developed by a source of noise and consequently, the output of VCO 10 (line 38) provides a signal (a clock signal) which varies as a function of the noise signal on line 14. The output of VCO 10 is sharpened by a Schmidt Trigger as is often done to provide a well defined square wave.

A voltage divider comprising the p channel transistors 16 and 17 and the n channel transistors 18 and 19 provide a voltage at node 15 which is coupled to an amplifier 11 through resistors 12 and 13. The amplifier 11 amplifies the difference in voltage between nodes 13.1 and 12.1 to provide the signal on line 14. This difference is created from thermal noise in resistors 12 and 13. An enable signal is coupled to the gate of the n channel transistor 19 and the complement of the enable signal is coupled to the gate of the p channel transistor 16. These transistors are used to power down the voltage divider.

In one embodiment resistors 12 and 13 are fabricated from an n-well and each comprise approximately 50K ohms. These resistors are connected to high impedance nodes within the amplifier 11 and consequently noise from the resistors is amplified by the amplifier 11. The n-well resistors 12 and 13 provide considerable noise and in a typical application the signal on line 14 which in one embodiment is nominally 2V, varies randomly by ±0.5 mV. Consequently, the frequency of the clock signal on line 38 randomly varies.

Both the amplifier 11 and the VCO 10 receive an enable signal on line 20 so that these devices may be powered down when not in use.

In one embodiment the entire circuit of FIG. 1 is fabricated employing well-known complementary-metal-oxide-semiconductors (CMOS) technology. The VCO 10 and amplifier 11 may be any one of a plurality of well-known circuits fabricated employing CMOS technology.

A plurality of separate ring oscillators 25-30 are used in the embodiment of FIG. 1. Each oscillator is fabricated to have a nominal operating frequency of approximately 600 megahertz (MHz). The output of each of the ring oscillators 25-30 is coupled to a D terminal of a D-type flip-flop 31-36, respectively. The clock terminals of the flip-flops 31-36 are coupled to line 38 and consequently the D-type flip-flops sample the output of their respective ring oscillators at a frequency determined by VCO 10.

Figure 2:
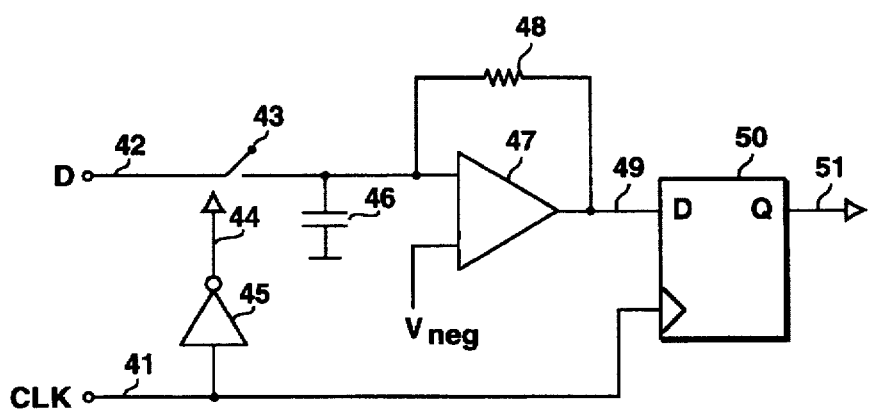
FIG. 2 illustrates in block diagram form the circuit of the present invention used to assure that the sampling circuit does not favor 1s or 0s.
Figure 3:
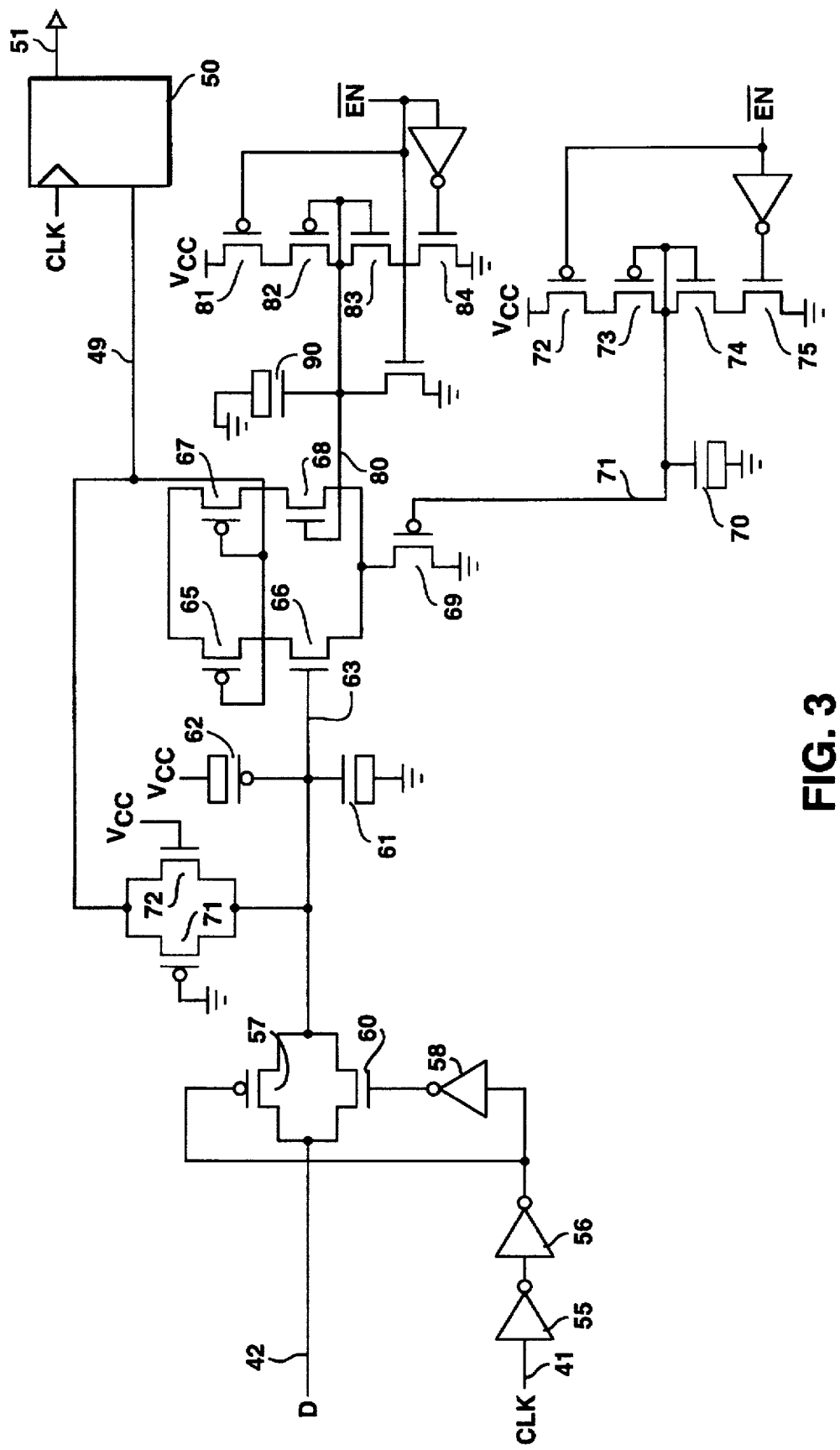
FIG. 3 is an electrical schematic of the circuit of FIG. 2.

The output of each of the D-type flip-flops (e.g., Q terminal) is coupled to an output line such as line 37 for flip-flop 31. A circuit which will be described in conjunction with FIGS. 2 and 3 is used between each of the ring oscillators and its associated D flip-flop. This circuit assures that the output of a ring oscillator is not sampled in such a way as to favor either a 1 or a 0. Thus, the output of each of the D-type flip-flops provides an equal distribution of 1s and 0s.

The ring oscillators in one embodiment each comprise a three stage ring oscillator using well-known circuitry. Also, the D-type flip-flops may employ ordinary circuitry when used in conjunction with the circuit of FIG. 2 and 3.

For the circuit of FIG. 1, the ring oscillators 25-30 provide asynchronous signals to their respective flip-flops. Moreover, while each of the ring oscillators is designed to have a nominal frequency of, for example 600 megahertz (MHz), each will have a somewhat different nominal frequency because of minor drawn device size difference and tolerances typically found in the design of such oscillators. Consequently, even though each of the ring oscillators is sampled simultaneously under the control of the signal on line 3 the samples will not be the same. Additionally, since the frequency of the signal on line 38 is varying because of the noise of resistors 12 and 13, the outputs from the D flip-flops will be random.

While the embodiment of FIG. 1 uses six ring oscillators and provides six random signals, this number is not critical to the present invention. Typically, the number of ring oscillators will be determined by the rate at which the random bits are needed. Note that each D flip-flop can provide one bit every approximately 2.2 μsecs or with six fast oscillators, 6 bits every 2.2 μsecs. If random bits are needed at a faster rate, more fast oscillators may be used.

The circuit of FIG. 1 has the advantage of using only a single low speed oscillator, VCO 10. The low speed oscillator requires more substrate area than each of the high speed oscillators 25–30. There is an overall efficient use of substrate area for the random number generator of FIG. 1 in that only a single low speed oscillator is used.

Referring now to FIG. 2, a single D-type flip-flop 51 is shown which receives a clock signal on line 41 (such as the output of VCO 10) and a high frequency signal on line 42 (such as the output of one of the ring oscillators 25–30).

The signal on line 42 is coupled through a switch 43 to the positive input terminal to the comparator 47. A capacitor 46 is also coupled to this input terminal. The other input terminal of the comparator 47 is coupled to a reference potential. Positive feedback from an output line 49 of the comparator 47 is provided to the positive input terminal through resistor 48.

The signal on line 44 causes the switch 43 to open and close under control of the clock signal. The clock signal is also coupled to the D-type latch 50. On the high level of the clock signal, latch 50 samples the state of the signal on line 49 and then sets or resets to provide that state on line 51.

The circuit of FIG. 2 essentially provides the functionality of a master/slave D-type flip-flop except it can latch a high speed signal without a preference for a 1 or 0. When the clock signal is low, the switch 43 is closed and the signal from line 42 is stored on the capacitor 43. When the clock signal goes high the switch is open and the last value of the signal on line 42 is stored on the capacitor. If this value is greater than the reference potential, then the comparator output will be a "1" and the feedback through resistor 48 will reinforce this value. Similarly if the signal on line 42 is below the reference when the switch 43 is opened, this value will be stored on capacitor 46 and the output on line 49 will be a 0. The 0 signal will be fed back through resistor 48 reinforcing this state. If the reference potential is selected such that the signal on line 42 has a 50% duty signal about the reference, then even distribution of 1s and 0s will be present on line 49 provided, of course, the clock signal is random relative to the signal on line 42.

In FIG. 3 the circuit of FIG. 2 is shown in schematic form. Again the lines 41 and 42 are shown as well as the latch 50.

The line 41 is coupled to inverters 55 and 56. The output of inverter gate 56 is coupled to the gate of the p channel transistor 57. The output of the inverter 56 is also coupled through the inverter 57 to the gate of the n channel transistor 60. The transistors 57 and 60 operate as a switch to pass the signal on line 42 when the clock signal is low, thus performing the function of switch 43 of FIG. 2. A capacitor 61 which is formed by a gate of a field effect device where both terminals of the device are coupled to ground, is connected to line 63. Another capacitor 62 is formed by the gate of a p channel device where the terminals of the device are coupled to Vcc. (For the schematic of FIG. 3 the p channel transistors are formed in n-wells which are coupled to Vcc). Thus, the capacitor 46 of FIG. 2 is shown in the schematic of FIG. 3 as capacitor 61 and 62.

The comparator of FIG. 2 is formed by transistors 65, 66, 67 and 68. The p channel transistor 65 is coupled in series with the n channel 66. Similarly the p channel 67 is coupled in series with the n channel 68. The common node between transistors 65 and 66 and the common node between transistor 67 and 68 are coupled to the gates of the transistors 65 and 67. This node, line 49, forms the output of the comparator. The positive input terminal of the comparator is line 63. Positive feedback is provided from line 49 to line 63 through transistors 71 and 72.

The comparator of FIG. 3 is referenced through a constant current source which includes the n channel transistor 69. The gate of this transistor is biased by a potential on line 71. This potential which is filtered by capacitor 70 is developed by the voltage divider comprising transistors 72, 73, 74 and 75. Transistors 72 and 75 are coupled to receive an enable signal and its complement so that they may be turned off when the circuit is disabled.

The negative input terminal to the comparator, line 80, is coupled to the gate of the transistor 68. The potential on line 80 is developed by a voltage divider comprising transistors 81, 82, 83 and 84. Transistors 81 and 82 receive the enable signal and its complement to allow the voltage divider to be powered down when the circuit is disabled. The signal on line 80 is filtered by the capacitor 90.

The circuit of FIG. 3 operates as described for the circuit of FIG. 2.

Thus, a random number generator has been disclosed which uses a single, relatively low frequency voltage controlled oscillator as a clock signal for sampling the outputs of a plurality of high frequency oscillators. A noise source is used to vary the frequency of the lower frequency oscillator. A M.S. flip-flop with a unique master stage is used for sampling the high frequency signal to assure that neither a 1 or a 0 is favored.

I claim:

1. A random number generator comprising:

a source of noise;

a first oscillator coupled to the source of noise having a nominal first frequency which is varied by the source of noise;

a second oscillator having a second frequency, the second frequency being higher than the first frequency; and, a sampling device for sampling an output of the second oscillator under the control of an output of the first oscillator, the sampling device being coupled to the first and second oscillators.

2. The generator of claim 1 wherein the second frequency is at least 10 times the first frequency.

3. The generator of claim 1 wherein the sampling device includes a circuit for assuring that the sampling does not favor a 1 or a 0 state.

4. The generator defined by claim 1 including a plurality of second oscillators and a plurality of corresponding sampling devices, all coupled to the first oscillator.

5. The generator of claim 4 wherein each of the sampling devices includes a circuit for assuring that the sampling does not favors a 1 or a 0 state.

6. The generator defined by claim 1 wherein the source of noise includes a n-well resistor.

7. The generator defined by claim 1 wherein the source of noise comprises a voltage divider and two n-well resistors.

8. The generator defined by claim 1 wherein the source of noise provides two separate noise signals coupled to the first oscillator through an amplifier.

9. The generator defined by claim 1 wherein the sampling device comprises;

a switch controlled by the first oscillator for switching the output of the second oscillator;

a capacitor coupled to an output of the switch;

a comparator providing an output signal coupled to the capacitor and a reference potential;

a positive feedback path for feeding back the output signal coupled to the comparator;

a D-type flip-flop, coupled to sample the output signal of the comparator under control of the first oscillator.

10. A method for generating a random number comprising the steps of:

generating a noise signal;

using the noise signal to cause frequency variations in a first signal having a nominal frequency of $f1$; and, sampling a second signal having a nominal frequency of $f2$ where $f2$ is a much higher frequency than $f1$ at a rate controlled by the first signal.

11. A random number generator comprising:

a source of noise;

a voltage controlled oscillator coupled to the source of noise, the voltage controlled oscillator operating at a first frequency;

a first ring oscillator operating at a second frequency, the second frequency being higher than the first frequency; and a first sampling device coupled to the voltage controlled oscillator and the first ring oscillator, the first sampling device, under control by an output of the voltage controlled oscillator, sampling an output of the first ring oscillator.

12. The random number generator of claim 11 further including a second ring oscillator operating at the second frequency and a second sampling device corresponding to the second ring oscillator, the second sampling device coupled to the second ring oscillator and the voltage controlled oscillator.

13. The random number generator of claim 12 wherein each of the first and second sampling devices includes a circuit for assuring that the sampling does not favors a logic high state or a logic low state.

14. The random number generator of claim 11, wherein the first sampling device comprises a switch controlled by the voltage controlled oscillator, the switch is used to switch the output of the first oscillator;

a capacitor coupled to an output of the switch;

a comparator coupled to the capacitor and a reference potential, the comparator provides an output signal;

a positive feedback path coupled to the comparator, the positive feedback path feeds back the output signal into the comparator; and a flip-flop coupled to the comparator, the flip-flop samples the output signal of the comparator under control of the voltage controlled oscillator.

15. The random number generator of claim 11, wherein the source of noise includes a voltage divider and a plurality of resistors.

16. The random number generator of claim 15, wherein the plurality of resistors are n-well resistors coupled to the voltage divider.

17. The random number generator of claim 16, wherein the source of noise further includes an amplifier having a first input coupled to a first n-well resistor and a second input coupled to a second n-well resistor.

* * * * *